United States Patent [19]

Kubo et al.

[11] Patent Number: 5,639,820

[45] Date of Patent: Jun. 17, 1997

[54] AQUEOUS DISPERSION COMPOSITION, PREPARATION THEREOF, WATER-AND OIL-REPELLENT AND MOLD RELEASE AGENT

[75] Inventors: Motonobu Kubo; Masamichi Morita, both of Settsu, Japan

[73] Assignee: Daikin Industries, Ltd., Osaka, Japan

[21] Appl. No.: 448,432

[22] PCT Filed: Nov. 25, 1993

[86] PCT No.: PCT/JP93/01725

§ 371 Date: Jun. 2, 1995

§ 102(e) Date: Jun. 2, 1995

[87] PCT Pub. No.: WO94/12548

PCT Pub. Date: Jun. 9, 1994

[30] Foreign Application Priority Data

Dec. 2, 1992 [JP] Japan .................................. 4-323138

[51] Int. Cl.$^6$ .......................... C08K 5/06; C08K 5/02
[52] U.S. Cl. .................... 524/758; 524/792; 524/801
[58] Field of Search ................................ 524/758, 792, 524/801

[56] References Cited

U.S. PATENT DOCUMENTS 5,240,990  8/1993  Kalifass et al. .................... 524/714

FOREIGN PATENT DOCUMENTS 341716  11/1989  European Pat. Off. .
63-284201  11/1988  Japan .

*Primary Examiner*—Jeffrey T. Smith
*Attorney, Agent, or Firm*—Birch, Stewart, Kolasch & Birch, LLP

[57] ABSTRACT

A method for preparing an aqueous dispersion composition containing a fluorocopolymer by the emulsion polymerizing of a polymerizable compound containing a polyfluoroalkyl group and another copolymerizable compound noncompatible with the polymerizable compound in an aqueous solution containing a compatibilizer, wherein the compatibilizer is selected from the group consisting of (a) a low-molecular weight compound having a perfluoroalkyl group and a hydrocarbon alkyl group in a molecule, (b) a low-molecular weight compound having a perfluoropolyether group and a hydrocarbon alkyl group in a molecule, (c) a macromolecular compound prepared by the copolymerization of a polymerizable compound containing a perfluoroalkyl group and a polymerizable hydrocarbon compound, and (d) a hydrocarbon macromolecular compound having a perfluoropolyether group in a molecule does not cause coagulation and can give an aqueous dispersion composition having the improved compatibility between the polymerizable monomers. The composition can be used as a water- and oil-repellent or mold release agent.

16 Claims, No Drawings

AQUEOUS DISPERSION COMPOSITION, PREPARATION THEREOF, WATER-AND OIL-REPELLENT AND MOLD RELEASE AGENT

FIELD OF THE INVENTION

The present invention relates to an aqueous dispersion composition and a preparation thereof, a water- and oil-repellent and mold release agent comprising said composition as an active component.

RELATED ART

Hitherto, a water- and oil-repellent formed from a copolymer comprising a polymerizable compound containing a polyfluoroalkyl group (hereinafter referred to as "fluoromonomer") and another copolymerizable compound which is not compatible therewith (hereinafter referred to as "hydrocarbon monomer"), for example, (meth)acrylate containing a long chain alkyl group such as stearyl acrylate is well-known (cf. Japanese Patent Kokai Publication Nos. 9619/1980 and 29501/1980, and Japanese Patent Kokoku Publication Nos. 8068/1985 and 56912/1988). The use of such hydrocarbon monomer can improve the oil-repellency without deteriorating the water-repellency. It is well-known that, since these monomers are not compatible with each other on the use of emulsion polymerization, a water-soluble organic solvent such as acetone is added to improve the compatibility between both monomers and to then improve the copolymerization property.

However, since a usual amount (10–30% by weight of an aqueous solution) of the water-soluble organic solvent gives remarkably insufficient compatibility between both monomers to give a significantly broad distribution of composition, an emulsion particle in which a phase rich in a fluorine-containing component is separated from a phase rich in a hydrocarbon component is formed to give a low water- and oil repellency and a low mold releasability of the copolymer. When a large amount of the water-soluble organic solvent is added to improve the compatibility between both monomers, the compatibility is increased but the surface activity of a surfactant emulsifying the monomers is decreased, so as to deteriorate significantly the emulsification state of the monomer emulsion so that a large amount of a coagulum disadvantageously generates after polymerization.

According to the prior arts, the improvement of compatibility results in the generation of coagulum, and it was very difficult to satisfy the both of improvement of compatibility and no generation of coagulum.

SUMMARY OF THE INVENTION

A main object of the present invention is to provide a method for preparing an aqueous dispersion composition having improved compatibility of monomers without the generation of coagulum.

According to one aspect, the present invention provides a method for preparing an aqueous dispersion composition containing a fluorocopolymer formed by emulsion polymerization of a polymerizable compound having a polyfluoroalkyl group and another copolymerizable compound non-compatible with the polymerizable compound, in an aqueous solution containing a compatibilizer, wherein the compatibilizer is selected from the group consisting of (a) a low-molecular weight compound having a perfluoroalkyl group and a hydrocarbon alkyl group in a molecule, (b) a low-molecular weight compound having a perfluoropolyether group and a hydrocarbon alkyl group in a molecule, (c) a macromolecular compound prepared by the copolymerization of a polymerizable compound having a perfluoroalkyl group and a polymerizable hydrocarbon compound, and (d) a hydrocarbon macromolecular compound having a perfluoropolyether group in the molecule.

According to another aspect, the present invention provides an aqueous dispersion composition prepared by the above method.

DETAILED EXPLANATION OF THE INVENTION

In the present invention, the fluorocopolymer contains at least 30% by weight of the polymerizable compound having the polyfluoroalkyl group (hereinafter referred to as "fluoromonomer") as the monomer unit. When the amount is smaller than 30% by weight, good water- and oil repellency and good mold releasability cannot be achieved. The amount of the other copolymerizable compound (hereinafter referred to as "hydrocarbon monomer") is from 10 to 70% by weight. When the amount is smaller than 10% by weight, the water- and oil-repellency and the mold releasability are not improved or the cost is disadvantageously high. When the amount is larger than 70% by weight, the oil-repellency and the mold releasability are low. When the amount of the hydrocarbon monomer is from 20 to 50% by weight, the water- and oil-repellency and the mold releasability are particularly excellent. A weight average molecular weight of the fluorocopolymer is usually from 5,000 to 200,000.

Specific examples of the fluoromonomer am the following vinyl monomers, a typical example of which is a (meth) acrylate containing a polyfluoroalkyl group:

 (A1)

 (A2)

 (A3)

 (A4)

 (A5)

 (A6)

 (A7)

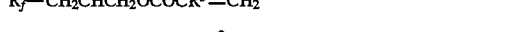 (A8)

wherein $R_f$ is a polyfluoroalkyl group or polyfluoroalkenyl group having 3 to 21 carbon atoms, $R^1$ is a hydrogen atom or an alkyl group having 1 to 10 carbon atoms, $R^2$ is an alkylene group having 1 to 10 carbon atoms, $R^3$ is a hydrogen atom or a methyl group, Ar is an arylene group which may have a substituent group, and n is an integer of 1 to 10.

Specific examples of the fluoromonomer are as follows:

$CF_3(CF_2)_7(CH_2)OCOCH=CH_2$, $CF_3(CF_2)_6(CH_2)OCOC(CH_3)=CH_2$, $(CF_3)_2CF(CF_2)_6(CH_2)_2OCOCH=CH_2$, $CF_3(CF_2)_7(CH_2)_2OCOC(CH_3)=CH_2$, $CF_3(CF_2)_7(CH_2)_2OCOCH=CH_2$, $CF_3(CF_2)_7SO_2N(CH_3)(CH_2)_2OCOCH=CH_2$, $CF_3(CF_2)_7SO_2N(C_2H_5)(CH_2)_2OCOC(CH_3)=CH_2$, $(CF_3)_2CF(CF_2)_6CH_2CH(OCOCH_3)CH_2OCOC(CH_3)=CH_2$, $(CF_3)_2CF(CF_2)_6CH_2CH(OH)CH_2OCOCH=CH_2$,

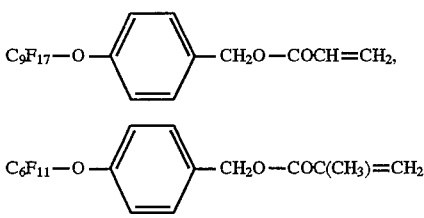

The hydrocarbon monomer is noncompatible with the fluoromonomer and specific examples of the hydrocarbon monomer are the following vinyl monomers such as a (meth)acrylate and a vinyl ester:

$CH_2=CHCOOR$ $CH_2=C(CH_3)COOR$ $CH_2=CHOCOR$ wherein R is a linear or branched alkyl group having 12 to 40 carbon atoms.

In addition to the above monomers, a vinyl monomer which does not have a polyfluoroalkyl group can be used. Specific examples of such vinyl monomer are ethylene, vinyl acetate, vinyl chloride, vinylidene halide, acrylonitrile, styrene, (meth)acrylamide, N-methylol(meth)acrylamide, hydroxyalkyl(meth)acrylate, vinyl alkyl ether, butadiene, isoprene, chloroprene, glycidyl (meth)acrylate and the like. The addition of such monomer can improve dry cleaning resistance, washing resistance, solubility, hardness, feeling and the like in addition to the water- and oil-repellency and the stain-proof property. The amount of the vinyl monomer other than the fluoromonomer and the hydrocarbon monomer is at most 20% by weight, preferably from 0.1 to 10% by weight of all monomers.

The compatibilizer used in the present invention is a low-molecular weight compound having a perfluoroalkyl group (or perfluoropolyether group) and a hydrocarbon alkyl group in a molecule; a macromolecular compound prepared by the copolymerization of a fluoromonomer and a hydrocarbon monomer; and a hydrocarbon macromolecular compound having a perfluoropolyether group in a molecule.

Specific examples of the low-molecular weight compound are as follows:

| | | |
|---|---|---|
| $C_nF_{2n+1}C_mH_{2m+1}$ | (n is 3 to 15, m is 3 to 22) | (B1) |
| $C_nF_{2n+1}CH_2CHIC_mH_{2m+1}$ | (n is 3 to 15, m is 1 to 20) | (B2) |
| $C_nF_{2n+1}CH_2OCOC_mH_{2m+1}$ | (n is 3 to 15, m is 3 to 22) | (B3) |
| $C_nF_{2n+1}COOC_mH_{2m+1}$ | (n is 3 to 15, m is 3 to 22) | (B4) |
| PFPE—$COOC_mH_{2m+1}$ | (n is 3 to 15, m is 3 to 22) | (B5) |

PFPE in the compound (B5) is a perfluoropolyether group and specific examples thereof are as follows:

$F(CF(CF_3)CF_2O)_nCF_2CF_2$—(n is 3 to 30)

$CF_3O(CF(CF_3)CF_2O)_n(CF_2O)_mCF_2$—(n is 2 to 30 and m is 3 to 70)

$CF_3O(CF_2CF_2O)_n(CF_2O)_mCF_2$—(n is 2 to 40 and m is 4 to 70)

$F(CF_2CF_2CF_2O)_nCF_2CF_2$—(n is 3 to 30).

The perfluoropolyether group preferably has a number average molecular weight of 500 to 5,000 (measured by $^{19}$F-NMR).

The compounds (B1) and (B2) can be prepared by the addition reaction of $C_nF_{2n+1}I$ to 1-alkene [N. O. Brace, J. Org. Chem., 27, 3033 (1962)]. The compound (B5) can be prepared by esterifying an acid fluoride of perfluoropolyether with a hydrocarbon alcohol.

Specific examples of the fluoromonomer in the macromolecular compound prepared by copolymerization of the fluoromonomer and the hydrocarbon monomer are the following compounds, a typical example of which is a (meth) acrylate such as one having perfluoroalkyl group:

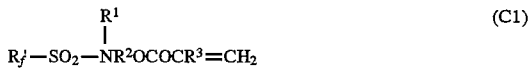

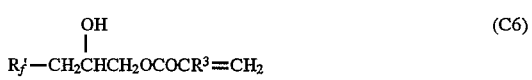

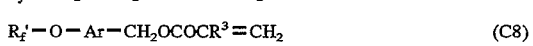

wherein $R_f'$ is a perfluoroalkyl group or perfluoroalkenyl group having 3 to 21 carbon atoms, $R^1$ is a hydrogen atom or an alkyl group having 1 to 10 carbon atoms, $R^2$ is an alkylene group having 1 to 10 carbon atoms, $R^3$ is a hydrogen atom or a methyl group, Ar is an arylene group which may have a substituent group, and n is an integer of 1 to 10.

Specific examples of the hydrocarbon monomer are (1) acrylic acid and methacrylic acid, and methyl, ethyl, butyl, isobutyl, t-butyl, propyl, 2-ethylhexyl, hexyl, decyl, lauryl, stearyl, isobornyl, β-hydroxyethyl, glycidyl, phenyl, benzyl and 4-cyanophenyl esters thereof; (2) a vinyl ester of a fatty acid such as acetic acid, propionic acid, caprylic acid, lauric acid and stearic acid; (3) a styrene compound such as styrene, α-methylstyrene and p-methylstyrene; (4) vinyl halides and vinylidene compounds such as vinyl fluoride, vinyl chloride, vinyl bromide, vinylidene fluoride and vinylidene chloride; (5) allyl esters such as allyl heptanoate, allyl caprylate and allyl caproate; (6) vinyl alkyl ketones such as vinyl methyl ketone and vinyl ethyl ketone; (7) acrylamides such as N-methylacrylamide and N-methylolmethacrylamide; and (8) a diene such as 2,3-dichloro-1,3-butadiene and isoprene.

The macromolecular compound may be an alternate, random, block or graft copolymer. The compatibilizer which is the block or graft copolymer has a fluorine-containing segment and a hydrocarbon segment.

The compatibilizer which is an alternate or random copolymer macromolecular compound can be synthesized by conventional solution polymerization or emulsion polymerization.

The compatibilizer which is the block copolymer macromolecular compound can be synthesized, for example, by a process wherein a living polymer of a hydrocarbon (meth) acrylate is polymerized in the presence of a polymerization initiator (for example, an aluminum porphyrin complex) and then a perfluoroalkyl group-containing (meth)acrylate is reacted therewith (cf. Japanese Patent Kokai Publication No. 120114/1992), and; a group transfer polymerization process [J. Am. Chem. Soc., 105, 5706 (1983), the disclosure of which is incorporated herein by reference]. The block copolymer may be a commercially available product such as MODIPER F 600 (manufactured by Nippon Oil & Fats Company), and SURFLON S-381 and S-382 (manufactured by Asahi Glass Company).

The compatibilizer which is the graft copolymer macromolecular compound can be synthesized by a process in which, by the use of the chain transfer procedure, a polymer radical initiation procedure, an initiation procedure using Ce (IV) or a polymer reaction procedure, a hydrocarbon branch segment is grafted to a fluorine-containing trunk segment prepared by conventional solution polymerization, emulsion polymerization and the like; and a process in which in the same procedure, a fluorine-containing branch segment is grafted to a hydrocarbon trunk segment; a process in which a hydrocarbon macromonomer is polymerized with a fluoromonomer or a fluorine-containing macromonomer is polymerized with a hydrocarbon monomer in conventional solution polymerization, emulsion polymerization or the like. The graft polymer may be a commercially available product such as ALON GF-150 and GF-300 (manufactured by Toagosei Chemical Industries).

Specific examples of the perfluoropolyether group in the hydrocarbon macromolecular compound having the perfluoropolyether group in molecule are as follows:

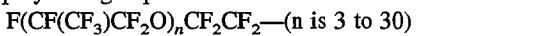
$F(CF(CF_3)CF_2O)_nCF_2CF_2$—(n is 3 to 30)

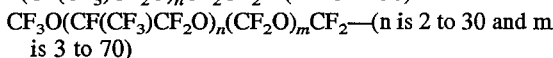
$CF_3O(CF(CF_3)CF_2O)_n(CF_2O)_mCF_2$—(n is 2 to 30 and m is 3 to 70)

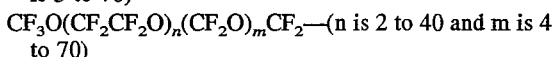
$CF_3O(CF_2CF_2O)_n(CF_2O)_mCF_2$—(n is 2 to 40 and m is 4 to 70)

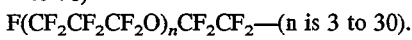
$F(CF_2CF_2CF_2O)_nCF_2CF_2$—(n is 3 to 30).

The suitable perfluoropolyether group used in the present invention preferably has a number average molecular weight of 500 to 5,000 (measured by $^{19}F$-NMR).

Specific examples of a hydrocarbon polymeric main chain in the hydrocarbon macromolecular compound are polymers prepared by the polymerization of at least one monomer selected from the group consisting of (1) acrylic acid and methacrylic acid and methyl, ethyl, butyl, isobutyl, t-butyl, propyl, 2-ethylhexyl, hexyl, decyl, lauryl, stearyl, isobornyl, β-hydroxyethyl, glycidyl, phenyl, benzyl, and 4-cyanophenyl esters thereof; (2) a vinyl ester of a fatty acid such as acetic acid, propionic acid, caprylic acid, lauric acid and stearic acid; (3) a styrene compound such as styrene, α-methylstyrene and p-methylstyrene; (4) vinyl halides and vinylidene compounds such as vinyl fluoride, vinyl chloride, vinyl bromide, vinylidene fluoride and vinylidene chloride; (5) allyl esters such as allyl heptanoate, allyl caprylate and allyl caproate; (6) vinyl alkyl ketones such as vinyl methyl ketone and vinyl ethyl ketone; (7) acrylamides such as N-methylacrylamide and N-methylolmethacrylamide; and (8) a diene such as 2,3-dichloro-1,3-butadiene and isoprene.

The macromolecular compound compatibilizer can be synthesized by, for example, an iodine transfer polymerization process in which a hydrocarbon (meth)acrylate is polymerized together with a perfluoropolyether having an iodine atom at one molecular end [Kobunshi Ronbunshu, 49(10), 765 (1992)]; a process in which methyl methacrylate is polymerized in the presence of an initiator (for example, perfluoro-oxa-alkanoylperoxide) and a perfluoropolyether group is introduced at both ends of polymethyl methacrylate chain; a process in which PFPE—COF and $HOCH_2CH_2OCOCH=CH_2$ are esterified; and a process in which PFPE—$CH_2OH$ and $ClCOCH=CH_2$ are esterified (wherein PFPE is a perfluoropolyether group).

In the macromolecular compound compatibilizer, the weight ratio of the hydrocarbon polymerizable compound to the perfluoroalkyl group-containing polymerizable compound and the weight ratio of the hydrocarbon polymeric chain to the perfluoropolyether group are usually from 95/5 to 5/95, preferably from 80/20 to 20/80.

The macromolecular compound compatibilizer has the weight average molecular weight (measured by GPC) of usually 1,000 to 400,000, preferably 10,000 to 200,000.

According to necessity, the compatibilizer can be used alone or in combination of at least two. The amount of the compatibilizer used is preferably from 0.1 to 20% by weight, more preferably from 1 to 10% by weight based on the total amount of the polymerizable compounds.

The aqueous dispersion emulsion of the present invention can be prepared by emulsifying the polymerizable compounds and the compatibilizer in a dispersing medium and conducting the copolymerization with stirring. The dispersing medium may be only water, or a mixture of water with a solvent. The solvent may be a ketone (for example, acetone and methyl ethyl ketone), an ester (for example, ethyl acetate), an alcohol (for example, methanol and ethanol) and the like. The amount of the dispersing medium is not limited and may be usually from 50 to 90 parts by weight per 100 parts by weight of the aqueous dispersion composition. The amount of the solvent is usually at most 50 parts by weight, preferably from 10 to 40 parts by weight per 100 parts by weight of water.

For the copolymerization, a polymerization initiator or an emulsifier may be added. Specific examples of the polymerization initiator are benzoyl peroxide, lauroyl peroxide, t-butyl perbenzoate, 1-hydroxycyclohexyl hydroperoxide, 3-carboxypropionyl peroxide, acetyl peroxide, azobisisobutylamidinedihydrochloride, azobisisobutyronitrile, sodium peroxide, potassium persulfate, ammonium persulfate and the like. The amount of the polymerization initiator is preferably from 0.1 to 5 parts by weight per 100 parts by weight of the polymerizable compounds. The emulsifier may be anionic, cationic or nonionic. The amount of the emulsifier is preferably from 1 to 10 parts by weight per 1 00 parts by weight of the polymerizable compounds.

The resultant aqueous dispersion composition can be used as an active component of a water- and oil-repellent or mold release agent. The resultant aqueous dispersion composition can be used as the water- and oil-repellent or mold release agent after the dilution with water to a suitable concentration.

The water- and oil-repellent of the present invention can be applied by a conventional procedure. For example, the water- and oil-repellent is adhered to a surface of a treated material by a coating process such as dipping and then the treated material is dried. If necessary, a suitable crosslinking agent is used together with the water- and oil-repellent to conduct curing. In addition to the water- and oil repellent of the present invention, another water-repellent or oil-repellent, an insecticide, a flame retardant, an antistatic agent, a paint fixing agent, an anti-crease agent and the like may be added.

An article treated with the water- and oil-repellent for textile treatment of the present invention is a textile which is not limited. Specific examples of the textile are an animal- or vegetable-origin natural fiber such as cotton, hemp, wool and silk: a synthetic fiber such as a polyamide, a polyester, polyvinyl alcohol, polyacrylonitrile, polyvinyl chloride and polypropylene; a semisynthetic fiber such as rayon and acetate: and a mixture of these fibers. The textile may be a fiber, and a yarn and fabric formed from fibers.

The mold release agent of the present invention can be used as an internal mold release agent or an external mold release agent. The mold release agent of the present invention can be used for the mold release of various polymers such as a synthetic resin, a natural resin, a synthetic rubber, a fluororubber and the like. Specific examples of the polymers are polyurethane, a chloroprene rubber, polycarbonate, a fluororesin, an epoxy resin, a phenol resin, a vinyl chloride resin and the like.

PREFERRED EMBODIMENT OF THE INVENTION

The present invention will be illustrated by the following Examples which do not limit the present invention.

The water repellency and the oil repellency are shown according to the following criteria. The water repellency is expressed by the water repellency No. (cf. the following Table 1) determined by the spray method according to JIS (Japanese Industrial Standard) L-1005. The oil repellency is determined by dropping several drops (diameter: about 4 mm) of a test solution shown in AATCC-TM-118-1966 (cf. Table 2) on two positions of a surface of a test cloth and observing the penetration state of the drops after 30 seconds. The superscript "+" or "−" to the water repellency No. and the oil repellency No. represents that the result is slightly better and slightly worse than said water repellency No. and said oil repellency No., respectively.

TABLE 1

| Water repellency No. | State |
|---|---|
| 100 | No wet on the surface |
| 90 | Slight wet on the surface |
| 80 | Partial wet on the surface |
| 70 | Wet on the surface |
| 50 | Wet over the whole surface |
| 0 | Complete wet on the front and back surfaces |

TABLE 2

| Oil repellency | Test solution | Surface tension (dyne/cm. 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | n-Hexadecane/Nujol (35/65 by weight) | 29.6 |

TABLE 2-continued

| Oil repellency | Test solution | Surface tension (dyne/cm. 25° C.) |
|---|---|---|
| 1 | Nujol | 31.2 |
| 0 | Inferior to 1 | — |

Preparative Example 1

(Synthesis of low-molecular weight compatibilizer having perfluoroalkyl group)

In a 200 ml four-necked flask equipped with a reflux condenser, a nitrogen introducing tube, a thermometer and a stirrer, 25.3 g (100 mmol) of 1-octadecene and 54.6 g (100 mmol) of $C_8F_{17}I$ were charged and heated to 60° C. Then, the atmosphere in the flask was replaced with a nitrogen gas for 30 minutes. 0.5 g (3 mmol) of azobisisobutyronitrile (AIBN) was added and the reaction was conducted for 6 hours to prepare a low-molecular weight compatibilizer having a perfluoroalkyl group.

Preparative Example 2

(Synthesis of low-molecular weight compatibilizer having perfluoropolyether group)

In a 200 ml four-necked flask equipped with a reflux condenser, a dropping funnel, a thermometer and a stirrer, 71.6 g (100 mmol) of a perfluoropolyether having a carboxylic acid at a molecular end of the formula:

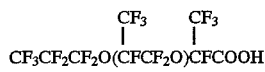

$$CF_3CF_2CF_2O(CFCF_2O)CFCOOH$$

was charged and then 18.6 g (100 mmol) of lauryl alcohol was dropwise added. After the addition, 0.5 ml of concentrated sulfuric acid was added to conduct the reaction at 75° C. for 6 hours so as to give a low-molecular weight compatibilizer having a perfluoropolyether group.

Preparative Example 3

(Synthesis of random polymeric compatibilizer having perfluoroalkyl group)

In a 200 ml four-necked flask, 8 g of stearyl acrylate (StA), 12 g of $CH_2=CHCOO(CH_2)_2C_8F_{17}$ (FA) and 180 g of 1,1,1-trichloroethane were charged and heated to 60° C. Then, the atmosphere in the flask was replaced with a nitrogen gas for 30 minutes. 1 g of t-butyl peroxypivalate (PERBUTYL PV manufactured by Nippon Oil & Fats Company) was added and the polymerization was conducted for 6 hours. The solvent was distilled off to give a random polymeric compatibilizer having a perfluoroalkyl group. A weight average molecular weight (measured by GPC): 15,000.

Preparative Example 4

(Synthesis of graft polymeric compatibilizer having perfluoroalkyl group)

In a 200 ml four-necked flask, 8 g of stearyl methacrylate macromonomer (MM8-SMA manufactured by Toagosei Chemical Industries, A molecular weight: 9,000), 12 g of $CH_2=CHCOO(CH_2)_2C_8F_{17}$ (FA) and 180 g of 1,1,1- trichloroethane were charged and heated to 60° C. Then, the atmosphere in the flask was replaced with a nitrogen gas for 30 minutes. 1 g of PERBUTYL PV was added and the polymerization was conducted for 6 hours. The solvent was distilled off to give a graft polymeric compatibilizer having a perfluoroalkyl group. A weight average molecular weight (measured by GPC): 25,000.

Preparative Example 5

(Synthesis of block polymeric compatibilizer having perfluoropolyether group)

In a 200 ml four-necked flask equipped with a reflux condenser, a dropping funnel, a nitrogen introducing tube and a stirrer, 16 g of a peroxide of perfluoropolyether of the formula:

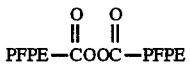

wherein PFPE is $F(CF_2CF_2CF_2)_{17}CF_2CF_2-$;
and 80 g of fluorinated hydrocarbon R-113 were charged and then a solution of 16 g of methyl methacrylate in 80 g of fluorinated hydrocarbon R-113 was dropwise added with stirring. After the addition, the mixture was heated to 35° C. and the polymerization was conducted for 6 hours with replacing the atmosphere with the nitrogen. n-Hexane was added to the reacted mixture to precipitate a polymer. The polymer was vacuum dried to give a block polymeric compatibilizer having a perfluoropolyether group. A weight average molecular weight (measured by GPC): 20,000.

Examples 1 to 5

A mixture consisting of 60 g of FA, 30 g of StA and 1.5 g of a compatibilizer prepared in Preparative Examples 1 to 5 (Example 1: use of a compatibilizer of Preparative Example 1, Example 2: use of a compatibilizer of Preparative Example 2, Example 3: use of a compatibilizer of Preparative Example 3, Example 4: use of a compatibilizer of Preparative Example 4, and Example 5: use of a compatibilizer of Preparative Example 5), 175 g of ion exchanged water, 0.1 g of n-lauryl mercaptan, 1 g of stearyltrimethylammonium chloride and 2 g of polyoxyethylene(20)octyl phenyl ether was heated to 60° C. and emulsified by a high pressure homogenizer. The resultant emulsion was charged in a 300 ml four-necked flask and kept at 60° C. for about 1 hour under the nitrogen atmosphere. The emulsion was sufficiently stirred and then a solution of 0.5 g of azobisisobutylamidinediacetate salt in 5 g of water was added to initiate the polymerization. The mixture was heated at 60° C. for 3 hours to give a polymeric emulsion. A gas chromatography analysis revealed that at least 99 % of monomers were polymerized.

Examples 6 to 10

The same procedure as in Examples 1-5 was repeated except that 130 g of ion exchanged water and 45 g of acetone were used instead of 175 g of ion exchanged water. Example 6 used a compatibilizer prepared in Preparative Example 1, Example 7 used a compatibilizer prepared in Preparative Example 2, Example 8 used a compatibilizer prepared in Preparative Example 3, Example 9 used a compatibilizer prepared in Preparative Example 4, and Example 10 used a compatibilizer prepared in Preparative Example 5.

Comparative Example 1

The same procedure as in Example 1 was repeated except that 1.5 g of ion exchanged water was used instead of the compatibilizer.

Comparative Example 2

The same procedure as in Example 6 was repeated except that 1.5 g of ion exchanged water was used instead of the compatibilizer.

Application Example 1

(used as water- and oil-repellent)

A polymer emulsion prepared in Examples 1 to 10 and Comparative Examples 1 and 2 was diluted with water to prepare a resinous liquid having a solid content of 0.5% by weight. A polyester fabric and cotton fabric were immersed in the resinous liquid, squeezed with a mangle and previously dried at 80° C. for 3 minutes. Then the fabric was thermally treated at 150° C. for 3 minutes and then a water- and oil-repellency test was conducted. The results of the water- and oil-repellency test are shown in Table 3.

TABLE 3

| | Performance as water- and oil-repellent | | | |
|---|---|---|---|---|
| No. | Compatibilizer | Acetone | PET | Cotton |
| Com. Ex. 1 | None | None | 70 | 1 | 50 | 0 |
| Ex. 1 | Low molecular weight (containing PFA group) | None | 90 | 4 | 70 | 2 |
| Ex. 2 | Low molecular weight (containing PFPE group) | None | 90 | 4 | 70 | 2 |
| Ex. 3 | Random polymer (containing PFA group) | None | 90 | 4 | 70 | 2 |
| Ex. 4 | Graft polymer (containing PFA group) | None | 90+ | 5 | 80 | 3 |
| Ex. 5 | Block polymer (containing PFPE group) | None | 90 | 5 | 70 | 3 |
| Com. Ex. 2 | None | Added | 80 | 2 | 70 | 1 |
| Ex. 6 | Low molecular weight (containing PFA group) | Added | 100 | 6 | 80 | 4 |
| Ex. 7 | Low molecular weight (containing PFPE group) | Added | 100 | 6 | 80 | 4 |
| Ex. 8 | Random polymer (containing PFA group) | Added | 100 | 6 | 80+ | 4 |
| Ex. 9 | Graft polymer (containing PFA group) | Added | 100+ | 7 | 90 | 5 |
| Ex. 10 | Block polymer (containing PFPE group) | Added | 100 | 7 | 80+ | 5 |

Note)
PFA group: Perfluoroalkyl group
PFPE group: Perfluoropolyether group

Application Example 2

(used as mold release agent)

A polymer emulsion prepared in Examples 1 to 10 and Comparative Examples 1 and 2 was used as an external mold release agent for molding an epoxy resin. The test procedure for the mold release was as follows.
1. Ingredients of the Epoxy Resin for the Test
   EPIKOTE #828 (manufactured by Shell Chemical) 100 pbw
   Triethylenetetramine 10 pbw
2 Mold and Molding Condition A mold release agent (which was diluted with water to a solid content of 1% by weight) was brush-coated on a steel mold and dried in air. The mold was a mold for disk which had a cavity having a size of 40 mm in diameter and 2 mm in thickness. A pin was mounted vertically in a center position to remove easily a molded article after the curing reaction. The above ingredients of the epoxy resin were intimately mixed, injected in the mold, kept standing at a room temperature for 2 hours and heated at 100° C. for 1 hour to conduct the curing reaction. When the pin was pulled manually to remove a molded article (a disk) from the mold, the mold releasability was evaluated by the hand feeling at that time according to the following criteria.

Determination criteria of mold releasability

5: The molded article can be removed substantially without a force

4: The molded article can be removed with a slight force

3: The molded article can be removed with a force

2: The molded article can hardly removed with a force

1: The molded article is adhered to the mold and cannot be removed with a force

A mold release life was determined by coating the mold release agent on the mold once, then measuring the deterioration of mold releasability without further coating the mold release agent. When the demolding could be made at the above criteria of at least 3, the molding was repeated without coating the mold release agent, and then the number of the mold release times of once before the above criteria of at most 2 was defined as the mold release life. The mold releasability rapidly decreased near the mold release life and was substantially the same before this point. The mold releasability shown in a table is a determined value which is most frequently exhibited when thus examined.

The results of the mold release test are shown in Table 4.

TABLE 4

Performance as mold release agent

| No. | Compatibilizer | Acetone | Mold releasability at first time | Life (number of times) |
|---|---|---|---|---|
| Com. Ex. 1 | None | None | 1 | 1 |
| Ex. 1 | Low molecular weight (containing PFA group) | None | 3 | 3 |
| Ex. 2 | Low molecular weight (containing PFPE group) | None | 3 | 3 |
| Ex. 3 | Random polymer (containing PFA group) | None | 3 | 3 |
| Ex. 4 | Graft polymer (containing PFA group) | None | 4 | 4 |
| Ex. 5 | Block polymer (containing PFPE group) | None | 4 | 4 |
| Com. Ex. 2 | None | Added | 3 | 2 |
| Ex. 6 | Low molecular weight (containing PFA group) | Added | 4 | 5 |
| Ex. 7 | Low molecular weight (containing PFPE group) | Added | 4 | 5 |
| Ex. 8 | Random polymer (containing PFA group) | Added | 4 | 5 |
| Ex. 9 | Graft polymer (containing PFA group) | Added | 5 | 6 |
| Ex. 10 | Block polymer (containing PFPE group) | Added | 5 | 6 |

Note)
PFA group: Perfluoroalkyl group
PFPE group: Perfluoropolyether group

EFFECT OF THE INVENTION

The use of the compatibilizer according to the present invention gives good compatibility between the fluoromonomer and the hydrocarbon monomer, even if the amount of the water-soluble organic solvent is small. Accordingly, the copolymerizability of both monomers is improved to give the excellent water- and oil-repellency and mold releasability. In addition, since the water-soluble organic solvent may have a small amount, a monomer emulsion has excellent emulsification state and the emulsion polymerization giving substantially no coagulum can be conducted. The addition of the compatibilizer according to the present invention can give an emulsion containing the fluorocopolymer having excellent water- and oil-repellency and mold releasability, even if the aqueous solution contains no water-soluble organic solvent.

What is claimed is:

1. A method for preparing an aqueous dispersion composition containing a fluorocopolymer comprising:

conducting emulsion polymerization of a first polymerizable compound having a polyfluoroalkyl group and a second copolymerizable compound having an alkyl group of from 12 to 40 carbon atoms, noncompatible with the first polymerizable compound, in an aqueous solution containing a compatibilizer compound, wherein the compatibilizer compound is selected from the group consisting of:

(a) a low-molecular weight compound having a perfluoroalkyl group and a hydrocarbon alkyl group in a molecule thereof, (b) a low-molecular weight compound having a perfluoropolyether group and a hydrocarbon alkyl group in a molecule thereof, (c) a macromolecular compound prepared by the copolymerization of a polymerizable compound having a perfluoroalkyl group and a polymerizable hydrocarbon compound, and (d) a hydrocarbon macromolecular compound having a perfluoropolyether group in a molecule thereof.

2. An aqueous dispersion composition prepared by the method according to claim 1.

3. A water- and oil-repellent containing the aqueous dispersion composition according to claim 2 as an active component.

4. A fiber treated with the water- and oil-repellent according to claim 3.

5. A mold release agent containing the aqueous dispersion composition according to claim 2 as an active component.

6. The method according to claim 1, wherein said fluorocopolymer formed contains at least 30% by weight of monomer units from said first polymerizable compound and from 10 to 70% by weight of monomer units from said second copolymerizable compound.

7. The method according to claim 6, wherein the monomer units from said second copolymerizable compound are present from 20 to 50% by weight.

8. The method according to claim 1, wherein said first polymerizable compound is a fluoromonomer represented by the following general formulae:

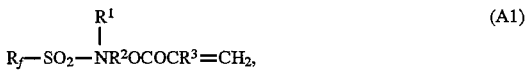

-continued $$R_f-COO(CH_2)_nCR^3=CH_2, \quad (A3)$$

$$R_f-CH_2OCOCR^3=CH_2, \quad (A4)$$

$$R_f-CONR^2OCOCR^3=CH_2, \quad \overset{R^1}{|} \quad (A5)$$

$$R_f-CH_2CHCH_2OCOCR^3=CH_2, \quad \overset{OH}{|} \quad (A6)$$

$$R_f-CH_2CHCH_2OCOCR^3=CH_2, \quad \overset{OCOR^3}{|} \quad (A7)$$

or $$R_f-O-Ar-CH_2OCOCR^3=CH_2 \quad (A8)$$

wherein $R_f$ is a polyfluoroalkyl group or polyfluoroalkenyl group having 3 to 21 carbon atoms, $R^1$ is a hydrogen atom or an alkyl group having 1 to 10 carbon atoms, $R^2$ is an alkylene group having 1 to 10 carbon atoms, $R^3$ is a hydrogen atom or a methyl group, Ar is an arylene group which may have a substituent group, and n is an integer of 1 to 10.

9. The method according to claim 1, wherein said second copolymerizable compound is a vinyl monomer represented by the following general formulae: $CH_2=CHCOOR$, $CH_2=C(CH_3)COOR$ or $CH_2=CHOCOR$, wherein R is a linear or branched alkyl group having 12 to 40 carbon atoms.

10. The method according to claim 8, wherein said first polymerizable compound is $CH_2=CHCOO(CH_2)_2C_8F_{17}$.

11. The method according to claim 9, wherein said second copolymerizable compound is stearyl acrylate.

12. The method according to claim 1, wherein said first polymerizable compound is $CH_2=CHCOO(CH_2)_2C_8F_{17}$ and said second copolymerizable compound is stearyl acrylate.

13. The method according to claim 1, wherein said compatibilizer compound (a) is a low-molecular weight compound represented by the following formulae:

$$C_nF_{2n+1}C_mH_{2m+1}, \quad (B1)$$

wherein n is 3 to 15 and m is 3 to 22;

$$C_nF_{2n+1}CH_2CHIC_mH_{2m+1}, \quad (B2)$$

wherein n is 3 to 15 and m is 1 to 22;

$$C_nF_{2n+1}CH_2OCOC_mH_{2m+1}, \quad (B3)$$

wherein n is 3 to 15 and m is 3 to 22;

or $$C_nF_{2n+1}COOC_mH_{2m+1}, \quad (B4)$$

wherein n is 3 to 15 and m is 3 to 22.

14. The method according to claim 1, wherein said compatibilizer compound (b) is a low-molecular weight compound represented by the following formula:

$$PFPE-COOC_mH_{2m+1}, \quad (B5)$$

wherein n is 3 to 15 and m is 3 to 22, and PFPE is a perfluoropolyether group selected from the group consisting of:

$F(CF(CF_3)CF_2O)_nCF_2CF_2—$, wherein n is 3 to 30;

$CF_3O(CF(CF_3)CF_2O)_n(CF_2O)_mCF_2—$, wherein n is 2 to 30 and m is 3 to 70;

$CF_3O(CF_2CF_2O)_n(CF_2O)_mCF_2—$, wherein n is 2 to 40 and m is 4 to 70; and $F(CF_2CF_2CF_2O)_nCF_2CF_2—$, wherein n is 3 to 30.

15. The method according to claim 1, wherein said compatibilizer compound (c) is a copolymer of a perfluoroalkyl-containing monomer represented by the following formulae:

$$R_f'-SO_2-NR^2OCOCR^3=CH_2, \quad \overset{R^1}{|} \quad (C1)$$

$$R_f'-(CH_2)_nOCOCR^3=CH_2, \quad (C2)$$

$$R_f'-COO(CH_2)_nCR^3=CH_2, \quad (C3)$$

$$R_f'-CH_2OCOCR^3=CH_2, \quad (C4)$$

$$R_f'-CONR^2OCOCR^3=CH_2, \quad \overset{R^1}{|} \quad (C5)$$

$$R_f'-CH_2CHCH_2OCOCR^3=CH_2, \quad \overset{OH}{|} \quad (C6)$$

$$R_f'-CH_2CHCH_2OCOCR^3=CH_2, \quad \overset{OCOR^3}{|} \quad (C7)$$

or $$R_f'-O-Ar-CH_2OCOCR^3=CH_2 \quad (C8)$$

wherein $R_f'$ is a perfluoroalkyl group or perfluoroalkenyl group having 3 to 21 carbon atoms, $R^1$ is a hydrogen atom or an alkyl group having 1 to 10 carbon atoms, $R^2$ is an alkylene group having 1 to 10 carbon atoms, $R^3$ is a hydrogen atom or a methyl group, Ar is an arylene group which may have a substituent group, and n is an integer of 1 to 10, and a polymerizable hydrocarbon monomer selected from the group consisting of (meth) acrylic acid or esters thereof, a vinyl ester of a fatty acid, a styrene derivative, vinyl halides, vinylidene compounds, allyl esters, vinyl alkyl ketones, acrylamides and dienes.

16. The method according to claim 1, wherein said compatibilizer compound (d) has a perfluoropolyether group in its molecule, represented by the following formulae:

$$F(CF(CF_3)CF_2O)_nCF_2CF_2—,$$

wherein n is 3 to 30;

$$CF_3O(CF(CF_3)CF_2O)_n(CF_2O)_mCF_2—,$$

wherein n is 2 to 30 and m is 3 to 70;

$$CF_3O(CF_2CF_2O)_n(CF_2O)_mCF_2—,$$

wherein n is 2 to 40 and m is 4 to 70; and $$F(CF_2CF_2CF_2O)_nCF_2CF_2—,$$

wherein n is 3 to 30.

* * * * *